US012722129B2

(12) United States Patent
Aigner et al.

(10) Patent No.: US 12,722,129 B2
(45) Date of Patent: Sep. 1, 2026

(54) SCREW HAVING A WEB FORMED UNDERCUT FOR AN EXTRUDER OR CONVEYOR

(71) Applicant: EREMA Engineering Recycling Maschinen und Anlagen Gesellschaft M.B.H., Ansfelden (AT)

(72) Inventors: Michael Aigner, Leonding (AT); Georg Weigerstorfer, Linz/Ebelsberg (AT); Herbert Freilinger, Weisskirchen an der Traun (AT); Klaus Feichtinger, Linz (AT)

(73) Assignee: EREMA Engineering Recycling Maschinen und Anlagen Gesellschaft m.b.H., Ansfelden (AT)

( * ) Notice: Subject to any disclaimer, the term of this patent is extended or adjusted under 35 U.S.C. 154(b) by 1007 days.

(21) Appl. No.: 17/441,232

(22) PCT Filed: Mar. 18, 2020

(86) PCT No.: PCT/AT2020/060100
§ 371 (c)(1),
(2) Date: Sep. 20, 2021

(87) PCT Pub. No.: WO2020/186281
PCT Pub. Date: Sep. 24, 2020

(65) Prior Publication Data

US 2022/0152566 A1 May 19, 2022

(30) Foreign Application Priority Data

Mar. 20, 2019 (AT) .............................. A 50243/2019

(51) Int. Cl.
*B01F 27/1143* (2022.01)
*B01F 27/171* (2022.01)
(Continued)

(52) U.S. Cl.
CPC ........ *B01F 27/1143* (2022.01); *B01F 27/171* (2022.01); *B29B 17/04* (2013.01);
(Continued)

(58) Field of Classification Search
CPC ................ B01F 27/1143; B01F 27/171; B01F 2101/2805; B01F 2215/0409;
(Continued)

(56) References Cited

U.S. PATENT DOCUMENTS 5,458,475 A 10/1995 Suumen
6,869,211 B2 * 3/2005 Reisenhofer ........... B29C 48/60 366/85

(Continued)

FOREIGN PATENT DOCUMENTS

CN 202491412 U 10/2012
CN 102933360 A 2/2013

(Continued)

OTHER PUBLICATIONS

Translation for DD 68377 A1 obtained Sep. 2024.*

(Continued)

*Primary Examiner* — Charles Cooley
(74) *Attorney, Agent, or Firm* — Kilpatrick Townsend & Stockton LLP

(57) ABSTRACT

A screw for an extruder or conveyor is disclosed. The screw includes a helical web extending around a core, where at least a portion of an active conveying flank of the web is formed with an undercut in the conveying direction. The screw may function as a conveying or dosing screw for processing polymer materials.

19 Claims, 5 Drawing Sheets

(51) Int. Cl.

| | |
|---|---|
| ***B01F 101/00*** | (2022.01) |
| ***B29B 17/04*** | (2006.01) |
| ***B29C 48/60*** | (2019.01) |
| ***B65G 33/26*** | (2006.01) |

(52) U.S. Cl.
CPC .............. *B29C 48/60* (2019.02); *B65G 33/26* (2013.01); *B01F 2101/2805* (2022.01); *B01F 2215/0409* (2013.01); *B01F 2215/0422* (2013.01)

(58) Field of Classification Search
CPC ... B01F 2215/0422; B29B 17/04; B29B 7/66; B29B 7/885; B29B 7/429; B29B 7/60; B65G 33/26; Y02P 70/10; B29C 48/277; B29C 48/507; B29C 48/60; B29C 45/60; B29C 48/505; B29C 48/59
See application file for complete search history.

(56) References Cited

U.S. PATENT DOCUMENTS

| | | | | |
|---|---|---|---|---|
| 7,188,992 | B2 * | 3/2007 | Mattingly, Jr. | B29B 7/481 366/85 |
| 2003/0137894 | A1 * | 7/2003 | Reisenhofer | B29C 48/60 366/85 |
| 2005/0024986 | A1 * | 2/2005 | Mattingly, Jr. | B29B 7/483 366/85 |
| 2005/0270894 | A1 * | 12/2005 | Gates | B29B 7/483 366/82 |
| 2007/0147169 | A1 * | 6/2007 | Mattingly, Jr. | B01F 27/7221 366/85 |
| 2012/0146292 | A1 * | 6/2012 | Ikeda | B29C 48/655 277/586 |
| 2013/0113139 | A1 * | 5/2013 | Weigerstorfer | B29B 17/0412 264/340 |
| 2015/0367532 | A1 | 12/2015 | Pohl | |
| 2022/0152566 | A1 * | 5/2022 | Aigner | B29B 7/66 |

FOREIGN PATENT DOCUMENTS

| | | | | | |
|---|---|---|---|---|---|
| CN | 205238513 | U | | 5/2016 | |
| CN | 106457644 | A | | 2/2017 | |
| DE | 68377 | A1 | * | 8/1969 | |
| DE | 10300009 | A1 | | 7/2003 | |
| EP | 0 487 076 | A2 | | 5/1992 | |
| EP | 2 689 908 | A1 | | 1/2014 | |
| EP | 3228435 | A2 | | 10/2017 | |
| JP | S57-84830 | A | | 5/1982 | |
| JP | H08-103926 | A | | 4/1996 | |
| JP | 2001-232676 | A | | 8/2001 | |
| JP | 2003-145533 | A | | 5/2003 | |
| JP | 2005169669 | A | * | 6/2005 | B29C 47/6075 |
| JP | 2009-045745 | A | | 3/2009 | |

OTHER PUBLICATIONS

International Search Report (ISR) in PCT/AT2020/060100; mailed Jul. 27, 2020; six pages.
International Preliminary Report on Patentability in PCT/AT2020/060100; dated Jun. 24, 2021; 28 pages.

* cited by examiner

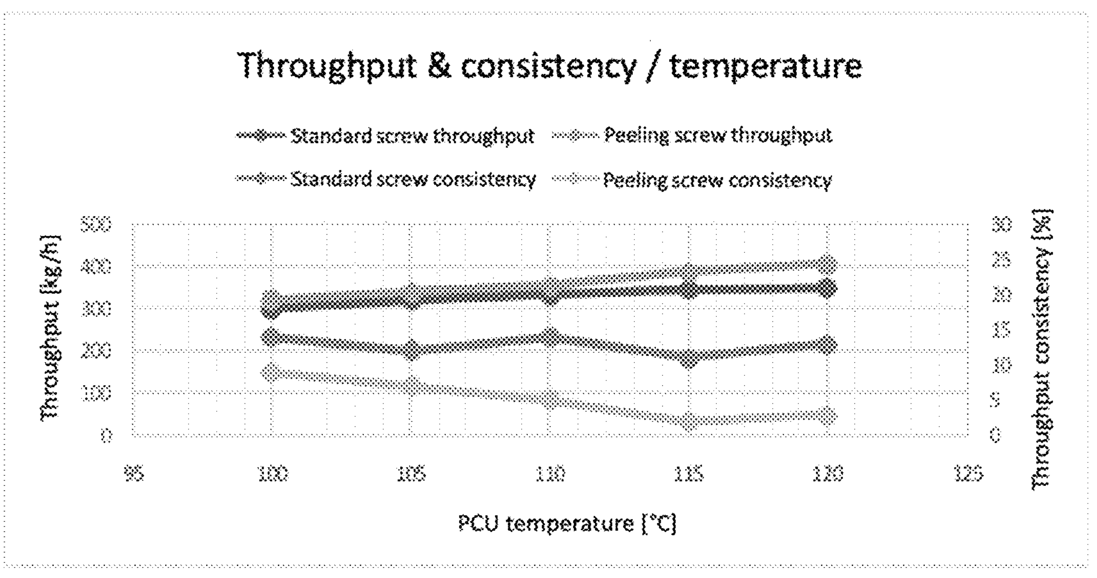
Fig. 6 – Example 1
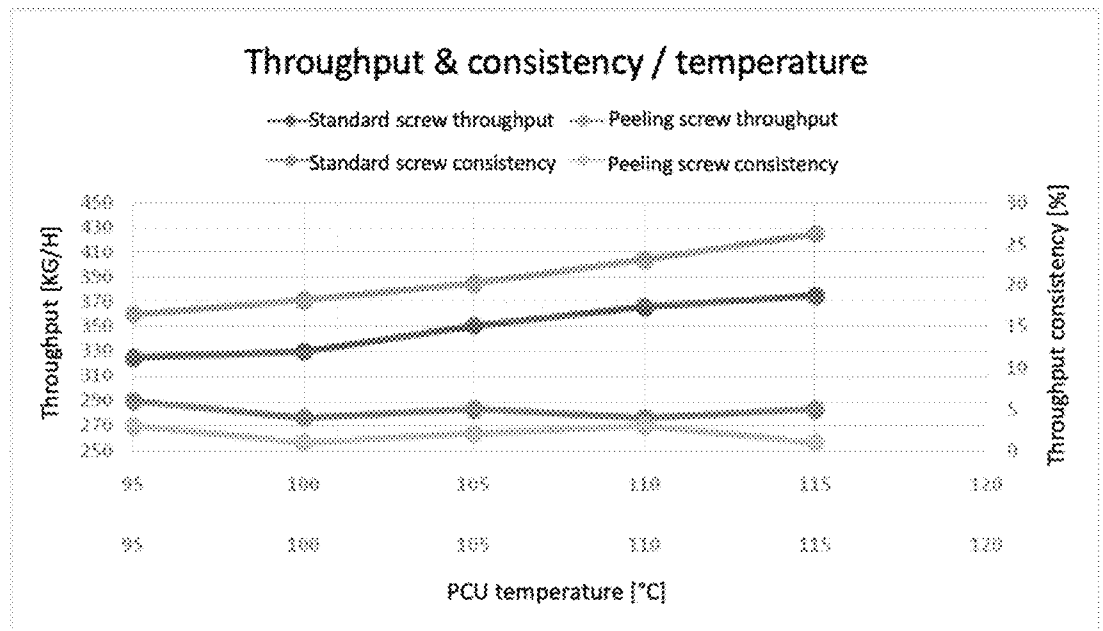
Fig. 7 – Example 2

SCREW HAVING A WEB FORMED UNDERCUT FOR AN EXTRUDER OR CONVEYOR

CROSS-REFERENCE TO RELATED APPLICATIONS

This application is a U.S. National Phase Application of PCT/AT2020/060100, filed Mar. 18, 2020, which claims the priority of Austrian Patent Application A 50243/2019, filed Mar. 20, 2019, the entireties of which are incorporated by reference herein.

BACKGROUND

Screws for conveyors or extruders are known in a wide variety of designs and variations for numerous applications. Depending on the application and requirements, the screw geometries differ not only in length and screw diameter but also, for example, in its pitch and flight width, in the flight depth, the pitch angle or the number of screw flights.

In the processing or recycling of thermoplastic and partially thermoplastic polymers from a wide variety of regions, one of the main tasks is to modify the shape and properties of these materials, for example semi-finished or finished products, which can originate from the industrial cycle but also from the consumer cycle, in such a way that an extrusion process can run in a correspondingly stable manner in order to ultimately produce high-quality recyclates.

Especially in the region of polymer recycling there is a multiplicity of special screws and extruders for this purpose, which are fed with polymer materials, plasticize and melt up these materials and finally convert them into granulates.

Devices for pretreating the materials to be processed are often connected upstream of the extrusion system, for example known cutting compressors or preconditioning units (PCU), which are usually containers with rotating tools coupled directly to the extruder. One of the tasks of this conditioning step, which precedes the extrusion process, is to change the shape and properties of the polymer materials accordingly, to break them up if necessary, and to increase their bulk density. Such combination devices have been known for a long time, for example from EP 2 558 263 or EP 2 689 908.

In this case, the mixing and/or comminuting tools rotating in the container also support the filling or feeding process of the extruder or conveyor connected to the container. Both the conveying process and the extrusion process are generally particularly efficient when the degree of filling of the screw is constant and sufficiently high. The region of the feeding of the conveyor or extruder is therefore sensitive and has a significant influence on the final result to be achieved or the quality of the recyclates. In this context, for example, the distance of the mixing and/or comminution tools from the extruder screw, the shape and size of the feed opening, the direction of rotation of the mixing tools in relation to the direction of conveying of the extruder play a role, but also on the side of the extruder or conveyor, among other things, the profile of the screw web, the shape of the screw base or the free open area of the screw flight. In the case of unfavourable intake geometries, for example, pumping of the volumetric throughput can occur, i.e. a change in throughput over time, whereby this is detrimental to reliable operation and to the quality of the recyclates.

Therefore, there has been no lack of attempts in the prior art to constructively adapt or design the region of the feeding of the conveyor or extruder in such a way that the intake behaviour and the feeding of the screw are supported in the best possible way and, for example, also become more tolerant of material differences caused by operation.

BRIEF DESCRIPTION OF THE DRAWINGS

FIGS. 6 and 7 show results of comparative tests.

DETAILED DESCRIPTION

Figures 1, 2:
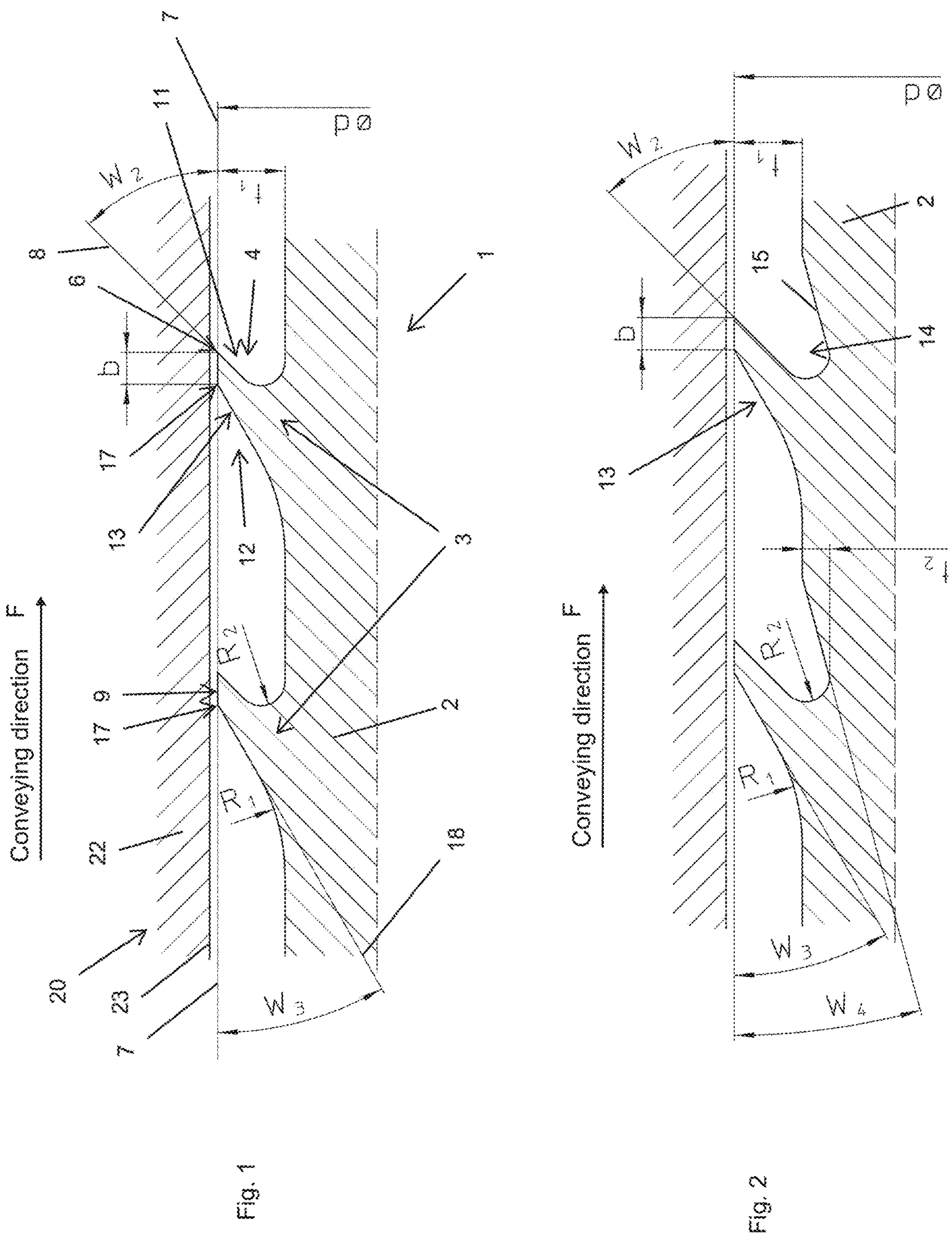
FIG. 1 shows a first embodiment of a screw geometry according to the present invention.
FIG. 2 shows a further embodiment of a screw geometry according to the present invention.

The invention relates to a screw for an extruder or conveyor according to the preamble of claim 1, an extruder or conveyor having at least one such screw, and subsequently also a device for treating, in particular recycling, plastic materials comprising such an extruder.

It is an object of the present invention to improve the feeding behaviour of a screw and, in particular, both the throughput and at the same time the throughput consistency.

This object is solved by the characterising features of claim 1. It is provided that the web of the screw is formed undercut, as seen in a conveying direction of the screw or the extruder, on its front active conveying flank. This undercut design does not necessarily have to be present over the entire screw length or the entire web, but is formed at least in a specific section or sub-region of the screw.

Surprisingly, it has been shown in this context that the design of the profile of the screw web by forming the undercut offers advantages in terms of intake behaviour and results in effective filling of the extruder.

Due to their special geometry, the active conveying flanks curved forward in this way apply forces to the materials located in the intake area that are directed differently than, for example, forces exerted by non-undercut conveying flanks. The undercut conveying flank is particularly advantageous when partly softened and partly still solid materials are fed into the screw. This is particularly advantageous for light materials such as foamed materials or materials with a smaller bulk density, whereby the somewhat more aggressive behaviour of the undercut conveying flanks offers advantages here in particular.

In principle, the effects mentioned are not only relevant for compressing screws for extruders or agglomerators, but also for non-compressing or less compressing conveying screws.

The term conveyor is used here to refer to both systems with non-compressing or decompressing screws, thus pure conveying screws, and systems with compressing screws, thus extruder screws with agglomerating or plasticizing effects.

In the present text, the terms extruder or extruder screw are understood to mean both extruders or screws with which the material is completely or partially melted, and extruders with which the softened material is only agglomerated but not melted. In agglomerating screws, the material is only strongly compressed and sheared for a short time, but not plasticized. The agglomerating screw therefore delivers material at its exit that is not completely melted, but consists of particles that are only melted on its surface and are caked together, as it were, in a sintering process. In both cases, however, pressure is exerted on the material via the screw and the material is compacted.

The term "undercut" is understood to mean that the front active conveying flank of the web is formed inclined or curved in the direction of the designated movement of the material in operation, thus in a conveying direction. As a result, an undercut region is formed on the active conveying flank, in which the foremost edge of the web, as seen in the conveying direction, defines the foremost region of the web, and the active conveying flank, starting from this foremost edge, runs offset backwards in the direction of the core, counter to the conveying direction.

In this context, it is advantageous if the undercut is formed with an undercut angle which is measured in a vertex on the foremost edge of the web in the conveying direction, in a normal cutting plane normal to the web, namely between an envelope of the screw and a tangent to the active conveying flank, wherein the undercut angle is in the range of $30° \leq w\mathbf{2} \leq 90°$. The envelope of the screw is formed by the outer web surfaces or the foremost edges of the web. Surprisingly, it has been shown here that an effect can be achieved even with a relatively small extent of undercutting compared to non-undercut screw webs.

In this context, it is particularly advantageous when the undercut angle is in the range of $30° \leq w\mathbf{2} \leq 65°$, in particular in the range of $40° \leq w\mathbf{2} \leq 50°$, preferably at about 45°.

A structurally advantageous embodiment provides that the active conveying flank, at least in a sub-region or section of the screw, in a radially outer section, in particular up to 50% of the active conveying flank, is formed plane or uncurved in the normal cutting plane.

It has surprisingly proved advantageous if it is provided that the screw, at least in a section of the screw, comprises an intake depth, measured between the envelope and the core in the region between two adjacent webs, for which applies: $0.03{*}d \leq t\mathbf{1} \leq 0.35{*}d$, in particular $0.125{*}d \leq t\mathbf{1} \leq 0.35{*}d$, wherein d is the outer screw diameter in this region. The particular setting of the flight depth t1 has proven to be advantageous, in particular, for cohesive bonded materials as well as for very light materials with a larger volume, such as foamed materials. In particular, the undercut as well as the setting of the flight depth is also advantageous when materials are fed into the extruder, such as when matted natural fibres are fed in, especially with smaller bulk density.

Furthermore, a geometry has proven to be advantageous for the intake behaviour if it is provided that the core, at least in a section of the screw, in the region in which the active conveying flank merges into the core or screw base, comprises an additional recess in which the core diameter is smaller than in the adjacent regions, wherein the following applies in particular to the additional depth of the recess: $0{*}t\mathbf{1} \leq t\mathbf{2} \leq t\mathbf{1}$. This additional depth results in a larger free volume, which yields an improvement in throughput consistency, particularly in the case of foam polymers.

In this context, it is advantageous if the active conveying flank, at least in a section of the screw, in the region in which the active conveying flank merges into the core, comprises a curvature, in particular in the shape of an arc, which extends at least over a range of >1 rad. This leads to greater self-cleaning and to the avoidance of sticking compared with angular designs.

Another advantageous construction provides that a core section adjacent to the recess and straight in the normal cutting plane is formed, which is inclined at an angle in the range of $0° \leq w\mathbf{4} \leq 45°$ to the envelope. Such designed transitions lead to improved self-cleaning. The active flank nevertheless still has a certain shear that cleans the screw, so the radii can be smaller than on the passive side of the screw flank.

Alternatively and/or additionally, it can be provided that the outer web surface of the web, at least in a section of the screw, in the region adjacent to the foremost edge of the web, preferably completely up to the rearmost edge, is formed uncurved in the normal cutting plane.

Furthermore, it is advantageous if the outer web surface, at least in a section of the screw, is oriented parallel to the envelope and/or to the wall of the housing of an extruder.

An improvement of the intake behaviour is also achieved if the passive conveying flank of the web adjoining the outer web surface is formed plane or uncurved in the normal cutting plane, at least in a section of the screw, in a radially outer section adjacent to the outer web surface, in particular up to a maximum of 70% of the passive conveying flank.

Furthermore, it is advantageous, especially for better self-cleaning, if the passive conveying flank, at least in a section of the screw, is inclined at a flank angle in the range of $30° \leq w\mathbf{3} \leq 90°$, measured in a vertex on the rearmost edge of the web in a conveying direction, in a normal cutting plane normal to the web, between the envelope of the screw and a tangent to the passive conveying flank.

The screw can be single-start or multi-start having a number of flights in the range of 2 to 20. It can be provided that the following applies to the pitch of the screw: $0.1{*}d \leq S \leq 5{*}d$, wherein d is the outer screw diameter. Multi-start screws, for example, contribute to better screw guidance. Especially when the material to be processed is highly cohesive and thus does not easily enter the screw, more scraping edges in terms of more webs are advantageous to fill the screw completely and evenly.

Furthermore, it can be provided that the following applies to the web width or the width of the outer web surface: $0{*}S \leq b \leq 0.5{*}S$, wherein S is the pitch of the screw.

It is particularly advantageous if the screw is formed undercut accordingly only in the initial region distal to the conveying direction or in the designated intake area of an extruder or conveyor, and in the remaining region the web comprises no undercut. Since the undercut screw geometry is advantageous especially in the filling of the screw, the design of the screw according to the invention is important in that region where the cylinder surrounding the screw is open, for example to feed material into the screw. Thus, the screw does not necessarily have to be of the same design over its entire length and have the undercut according to the invention everywhere. However, it is particularly advantageous if the design according to the invention is present in precisely those regions in which material is picked up by the screw and the screw can act on the fed material.

According to the present invention, there is furthermore an extruder or conveyor, in particular for polymers, having at least one screw according to the invention which is arranged rotatably in a housing and in particular plasticizing or agglomerating.

In this context, it is particularly advantageous when the screw is formed, in particular exclusively, in the region of an opening of the housing of the extruder, in particular in the region of an intake opening or feeding opening for the material, according to the present invention. The special undercut and other design of the screw is thus advantageously provided straight in the region of the intake opening or feeding opening of the extruder. However, it is not relevant here whether this feeding opening is located in the initial region of the extruder or in a region located further downstream in a conveying direction. Also, the design of the screw is not limited to a single opening and several openings can also be provided in the extruder into which material can be fed and where the design of the screw according to the invention brings about advantages in the intake behaviour.

Furthermore, according to the invention, there is a device for the treatment of plastics, in particular of thermoplastic waste plastic for recycling purposes, having a container and/or cutting compressor for pretreating the material to be processed, and an extruder or conveyor connected thereto, in particular tangentially, according to the present invention having a screw according to the present invention.

In this context, it is particularly advantageous if at least one rotating mixing and/or comminuting tool rotatable about an axis of rotation is arranged in the container for mixing, heating and, if necessary, comminuting the plastic material, wherein a container opening is formed in a side wall of the container in the region of the height of the or the lowermost mixing and/or comminution tool closest to the bottom, through which the pretreated plastic material can be discharged from the interior of the container, wherein at least one extruder or conveyor according to the present invention is provided for receiving the material pretreated in the container, wherein the housing of the extruder includes an intake opening, located on its end face or in its sheath wall, for the material to be gripped by the screw and the intake opening is in communication with the container opening.

For an advantageous intake behaviour, it is, among other things, also co-determining how the mixing and/or comminution tools of the cutting compressor introduce the pretreated material into the intake opening of the extruder or support this process. This depends, among other things, on the direction of rotation of the screw and the direction of rotation of the mixing and/or comminution tools. In this context, it has proven to be particularly advantageous if in the region before the container opening or in the region before the intake opening or feeding opening of the conveyor or extruder the direction of rotation of the mixing and/or comminuting tool runs essentially counter to or in the opposite direction to the conveying direction of the extruder.

Such arrangements are already known in principle, for example from EP 2 558 263 B1 or EP 2 689 908 B1, but have also proved particularly advantageous in this context with the screw geometry according to the invention. The arrangements described in EP 2 558 263 B1 or EP 2 689 908 B1, equipped with the screw designed according to the invention, are incorporated by reference in the present disclosure.

In this regard, it is first provided that the imaginary extension of the central longitudinal axis of the conveyor, in particular extruder, if the latter has only a single screw, or the longitudinal axis of the screw closest to the intake opening, if the latter has more than one screw, passes by the axis of rotation without intersecting it, counter to the conveying direction of the conveyor, wherein the longitudinal axis of the conveyor, if it has a single screw, or the longitudinal axis of the screw closest to the intake opening is offset on the discharge side by a distance from the radial of the container parallel to the longitudinal axis and directed outwardly from the axis of rotation of the mixing and/or comminution tool in a conveying direction of the conveyor. As a result, the conveying direction of the mixing tools and the conveying direction of the conveyor are no longer in the same direction, as known from the prior art, but at least slightly in opposite directions, which reduces a plugging effect. By deliberately reversing the direction of rotation of the mixing and/or comminution tools compared to previously known devices, the feeding pressure on the intake area decreases and the risk of overfilling is reduced. In this way, excess material is not stuffed or spatulated into the intake area of the conveyor with excessive pressure, but on the contrary, excess material even tends to be removed from there again, so that although there is always sufficient material in the intake area, it is almost pressureless or only subjected to smaller pressure. In this way, the screw can be sufficiently filled and always draw in sufficient material without overfilling the screw and subsequently causing local pressure peaks at which the material could melt.

In this way, melting of the material in the region of the intake is prevented, which increases the operational efficiency, extends maintenance intervals, and shortens downtime due to possible repairs and clean-up.

By reducing the feed pressure, slider, which can be used to regulate the degree of filling of the screw in a known manner, react much more sensitively and the degree of filling of the screw can be adjusted even more precisely. Especially with heavier materials, such as grist made of high-density polyethylene (HDPE) or PET, it is easier to find the optimum operating point of the system.

In addition, it has surprisingly proven beneficial that materials that have already been softened to close to the melt are better drawn in during the counter-rotating operation according to the invention. In particular, when the material is already in a doughy or softened state, the screw cuts the material from the doughy ring that is close to the container wall. If the screw were to rotate in a conveying direction, this ring would tend to be pushed further and no scraping could be done by the screw, resulting in a decrease in intake. This is avoided by reversing the direction of rotation according to the invention.

In addition, when processing the above-described stripy or fibrous materials, the formed hang-ups or accumulations can be released more easily or are not formed at all, since on the edge of the opening which is located on the drain side in the direction of rotation of the mixing tools or downstream, the direction vector of the mixing tools and the direction vector of the conveyor point in almost opposite or at least slightly opposite directions, as a result of which an elongated strip cannot bend around this edge and become entangled, but is carried along again by the mixing stream in the receiving container.

Overall, the design according to the invention improves the intake behaviour and significantly increases the throughput. The overall system of cutting compressor and conveyor thus becomes more stable and more efficient.

According to an advantageous further development, it is provided that the conveyor is arranged on the receiving container in such a way that the scalar product of the direction vector (direction vector of the direction of rotation) oriented tangential to the flight circle of the radially outermost point of the mixing and/or comminution tool or to the plastic material passing by the opening and normal to a radial of the receiving container, and pointing in the direction of rotation or movement of the mixing and/or comminution tool, and the direction vector of the conveying direction of the conveyor in each individual point or in the entire region of the opening or in each individual point or in the entire region immediately radially in front of the opening, is zero or negative. The region immediately radially in front of the opening is defined as the region in front of the opening where the material is just about to pass through the opening, but has not yet passed through the opening. In this way, the advantages mentioned are achieved and any agglomeration in the region of the intake opening caused by plugging effects is effectively avoided. In particular, the spatial arrangement of the mixing tools and the screw relative to each other is also not important; for example, the axis of rotation does not have to be oriented normal to the bottom surface or to the longitudinal axis of the conveyor or screw. The direction vector of the direction of rotation and the direction vector of the conveying direction lie in one, preferably horizontal, plane, or in a plane oriented normal to the axis of rotation.

A further advantageous embodiment results from the fact that the direction vector of the direction of rotation of the mixing and/or comminution tool encloses an angle of greater than or equal to 90° and less than or equal to 180° with the direction vector of the conveying direction of the conveyor, the angle being measured at the point of intersection of the two direction vectors at the edge of the opening located upstream of the direction of rotation or movement, in particular at the point located furthest upstream on this edge or opening. This describes the angular range in which the conveyor must be arranged on the receiving container in order to achieve the beneficial effects. In this case, in the entire range of the opening or in each individual point of the opening, there is at least a slight opposite alignment of the forces acting on the material or, in extreme cases, a pressure-neutral transverse alignment. At no point in the opening is the scalar product of the direction vectors of the mixing tools and the screw positive, so not even in a sub-region of the opening does an excessive tamping effect occur.

A further advantageous embodiment of the invention provides that the direction vector of the direction of rotation or movement encloses an angle between 170° and 180° with the direction vector of the conveying direction, measured at the point of intersection of the two direction vectors in the centre of the opening. Such an arrangement applies, for example, when the conveyor is arranged tangentially to the cutting compressor.

Advantageously, in order to ensure that no excessive stuffing effect occurs, it may be provided that the distance or offset of the longitudinal axis from the radial is greater than or equal to half the inner diameter of the housing of the conveyor or the screw.

Further, in this sense, it may be advantageous to dimension the distance or the offset of the longitudinal axis from the radial greater than or equal to 5% or 7%, even more advantageously greater than or equal to 20%, of the radius of the receiving container. For conveyors with an extended intake area or grooved bushing or extended pocket, it may be advantageous if this distance or this offset is greater than or equal to the radius of the receiving container. In particular, this is true in cases where the conveyor is adjoined tangentially to the receiving container or runs tangentially to the cross-section of the container.

Advantageously, the outermost flights of the screw do not project into the container.

It is particularly advantageous if the longitudinal axis of the conveyor or of the screw or the longitudinal axis of the screw nearest the intake opening or the inner wall of the housing or the envelope of the screw runs tangentially to the inside of the side wall of the container, the screw preferably being connected at its end face to a drive and conveying at its opposite end face to an outlet opening arranged at the end face of the housing, in particular an extruder head.

It is advantageous if it is provided that the opening is connected directly and without longer spacing or transfer distance, e.g. of a conveying screw, to the intake opening. This enables an effective and gentle material transfer.

In a further particularly advantageous embodiment, it is provided that the receiving container is essentially cylindrical with a flat bottom surface and a cylinder-shell-shaped side wall oriented vertically thereto. It is further structurally simple if the axis of rotation coincides with the central centre axis of the receiving container. In a further advantageous embodiment, it is provided that the axis of rotation or the central centre axis of the container are oriented vertically and/or normal to the bottom surface. These particular geometries optimize the intake behaviour in a structurally stable and simply constructed device.

In this context, it is also advantageous to provide that the mixing and/or comminution tool, or, if several mixing and/or comminution tools arranged one above the other are provided, the lowest mixing and/or comminution tool closest to the bottom, as well as the opening are arranged at a smaller distance from the bottom surface, in particular in the region of the lowest quarter of the height of the receiving container. The distance is defined and measured from the lowest edge of the opening or intake opening to the bottom of the container in the edge area of the container. Since the corner edge is usually formed rounded, the distance is measured from the lowermost edge of the opening along the imaginary downward extensions of the side wall to the imaginary outward extension of the container base. Well-suited distances are 10 to 400 mm.

Furthermore, it is advantageous for processing if the radially outermost edges of the mixing and/or comminution tools reach close to the side wall.

The container does not necessarily have to have a circular cylindrical shape, although this shape is advantageous for practical and manufacturing reasons. Container shapes deviating from the circular-cylindrical shape, such as frustoconical containers or cylindrical containers with an elliptical or oval outline, must be converted to a circular-cylindrical container of the same capacity, assuming that the height of this fictitious container is equal to its diameter. Container heights which essentially exceed the resulting mixing stream (taking into account the safety distance) are not taken into account, since this excessive container height is not used and therefore no longer has any influence on the material processing.

In the examples described in the following figures, conveyors with a single screw, for example single-shaft or single-screw extruders, are shown throughout. Alternatively, however, it is also possible to provide conveyors with more than one screw, for example twin or multi-shaft conveyors or extruders, in particular with several identical screws having at least the same diameter d.

Further advantages and embodiments of the invention will be apparent from the description and the accompanying drawings. The invention is illustrated schematically by means of embodiments in the drawings and is described below with reference to the drawings, for example.

Figure 4A:
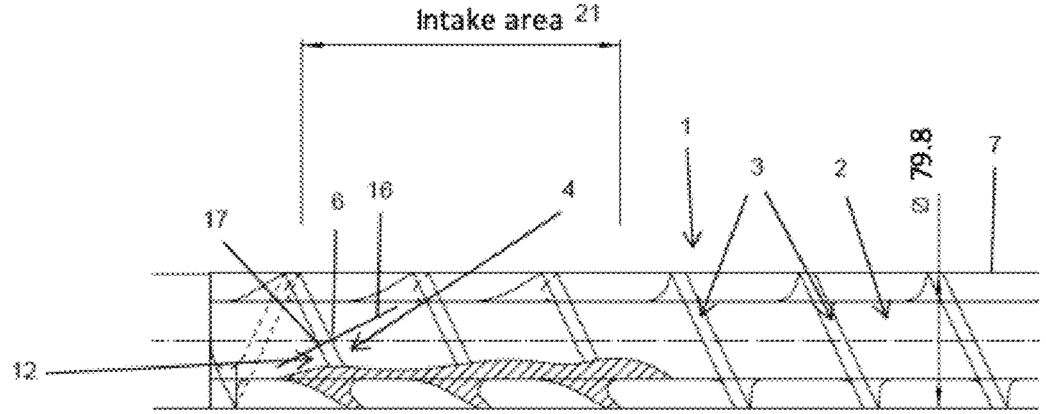
FIGS. 4*a* and 4*b* show a peeling screw according to the present invention.

In FIGS. 1 and 2 there is shown a detailed view of a first and a second embodiment of a screw geometry according to the invention. These are each normal sections through the web 3, i.e. at right angles to the front and rear web edges 6, 17, forming the normal cutting plane 16, which runs in the image plane in FIGS. 1 and 2. The course of this normal cutting plane 16 is also shown in FIG. 4*a*.

A screw 1 can be seen, which is arranged in an axis-rotatable manner in the interior of an indicated extruder or conveyor 20. This may be a compressing or agglomerating screw. The screw 1 has a core 2 as well as a web 3 running helically around this core 2. The web 3 has a front active conveying flank 4 pointing in conveying direction F and a rear passive conveying flank 12 pointing in the opposite direction.

In the radially outermost region are the outer web surfaces 9 with a foremost edge 6 pointing in conveying direction F and an opposite rearmost edge 17. The outer web surface 9 is curved in the circumferential direction of the screw, but formed straight and not curved in the normal cutting plane 16 and runs parallel to the wall 23 of the housing 22 of the extruder 20.

An envelope 7 of the screw 1 is formed by the outer web surfaces 9 and the foremost edges 16, respectively, the envelope 7 also being oriented parallel to the wall 23 in the present embodiments. Accordingly, the envelope 7 as well as the outer web surfaces 9 of the web 3 are oriented parallel to the central longitudinal axis of the screw 1.

The undercut of the active conveying flank 4 is defined by an undercut angle w2. This undercut angle w2 is measured at a vertex located on the foremost edge 6 of the web 3 in a conveying direction F. The angle w2 is formed between the envelope 7 and the tangent 8, which is placed through the vertex on the active conveying flank 4, namely in the normal cutting plane 16. In the present case, the same undercut angle w2 also results between the tangent 8 and a parallel to the central longitudinal axis, but in the case of conical screws there would be differences here. In the embodiment according to FIG. 1, the undercut angle w2 is approximately 45°.

In a radially outer section 11, the active conveying flank 4 has a plane design or this region is not formed curved in the normal cutting plane 16. This section 11 extends to about half of the active conveying flank 4 and then merges into the core 2 in a curved region. This curvature R2 is arc-shaped and extends over a region of slightly less than 2 rad.

In the embodiment according to FIG. 1, the diameter of the core 2 is essentially constant, at least in the section of the screw 1 shown. The intake depth 1 measured between the envelope 7 and the core 2 in the region between two adjacent webs 3 is about 25% of the screw diameter d in this region. As mentioned at the outset, the intake depth t1 in combination with the undercut is particularly advantageous for the intake behaviour.

The passive conveying flank 12 adjoins downstream of the rearmost edge 17 counter to the conveying direction F and has a radially outer section 13 which is formed plane or not curved in the normal cutting plane 16. In the embodiment according to FIG. 1, this section 13 extends over about 60% of the length of the passive conveying flank 12 and then merges into the region of the core 2 via an arc-shaped curvature R1. The passive conveying flank 12 is inclined accordingly, namely at a flank angle w3 measured at the vertex located on the rearmost edge 17 of the web 3 in a conveying direction F. The flank angle w3 is formed in this case between the envelope 7 and a tangent 18 to the passive conveying flank 12 passing through the apex, namely in the normal cutting plane 16. In the embodiment according to FIG. 1, the angle w3 is about 30°:

In the embodiment according to FIG. 2, the shape or geometry of the webs 3 is similar to that in FIG. 1, namely both in the design of the undercut and in the shape of the webs 3. However, in contrast to FIG. 1, an additional recess 14 is formed in the region in which the active conveying flank 4 merges into the core 2 or screw base. In this, the diameter of the core 2 is somewhat smaller than in the adjacent regions of the core 2, defining an additional depth t2 compared to the intake depth t1. In the embodiment according to FIG. 2, this additional depth t2 is about 20% of the intake depth t1. This recessed screw base has a straight core section 15 in the normal cutting plane 16, which is inclined at an angle w4 of about 20° to the envelope 7 or to the remaining region of the core 2. This recess 14, together with the undercut, also results in advantageous intake behaviour.

Figure 3:
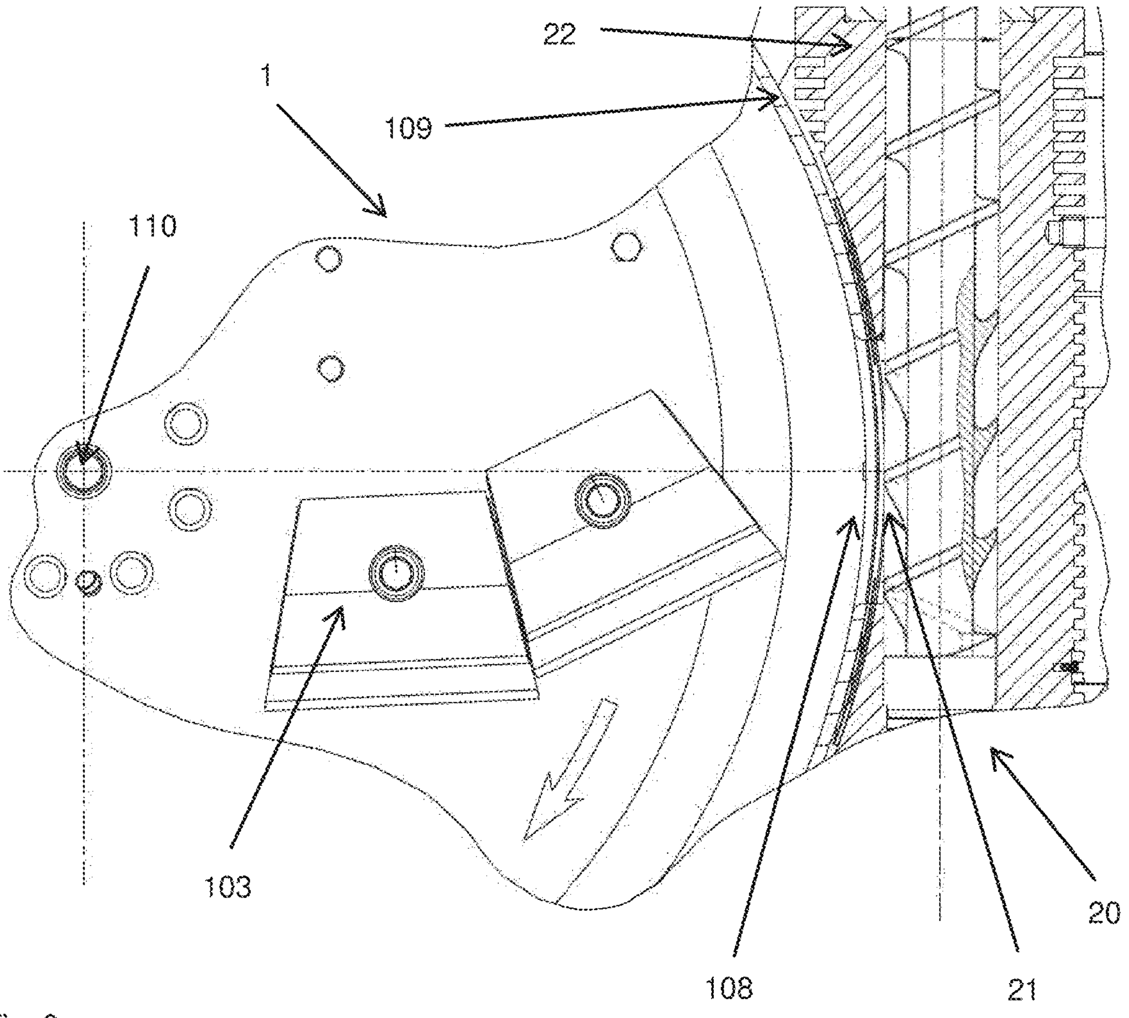
FIG. 3 shows the connection of an extruder according to the present invention to a container.

FIG. 3 shows the connection of an extruder according to the present invention to a container. The connection can be used in a device for treating plastics, in particular thermoplastic waste plastic for recycling purposes, with a container for the material to be processed, wherein in the container at least one rotating mixing and/or comminuting tool rotatable about an axis of rotation 110, 103 is arranged for mixing, heating and, if necessary, crushing the plastic material, wherein a container opening 108 is formed in a side wall 109 of the container in the area of the height of the lowest mixing and/or comminuting tool 103, through which the pretreated plastic material from the interior of the container can be applied, wherein at least one extruder or conveyor 20 is provided for receiving the material pretreated in the container, the housing 22 of the extruder 20 having a feed opening 21 on its end face 107 or in its jacket wall for the material to be grasped by the screw 1, and the feed opening 21 with the container opening 108 is in the connection.

EXAMPLES

The following comparative tests were carried out on an Intarema 1108 TE cutting compressor/extruder combination:

| | Device type | Comment |
|---|---|---|
| Process unit | Intarema 1108 TE | Diameter container 1100 mm; Diameter extruder 80 mm |
| Melt filter | RTF 4/34 | Filtration 12/64 |
| Granulation | HG 154 D | Perforated plate 20 × 3 |

Figure 4B:
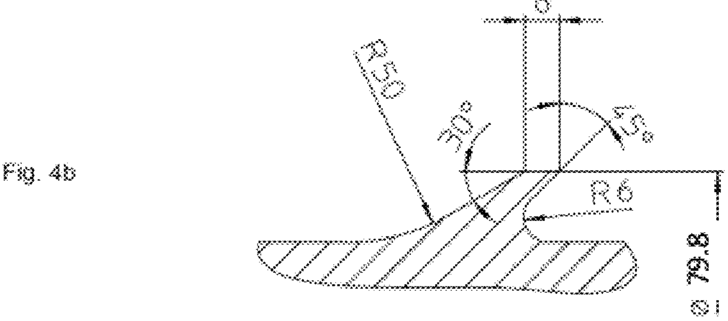
Figure 5A:
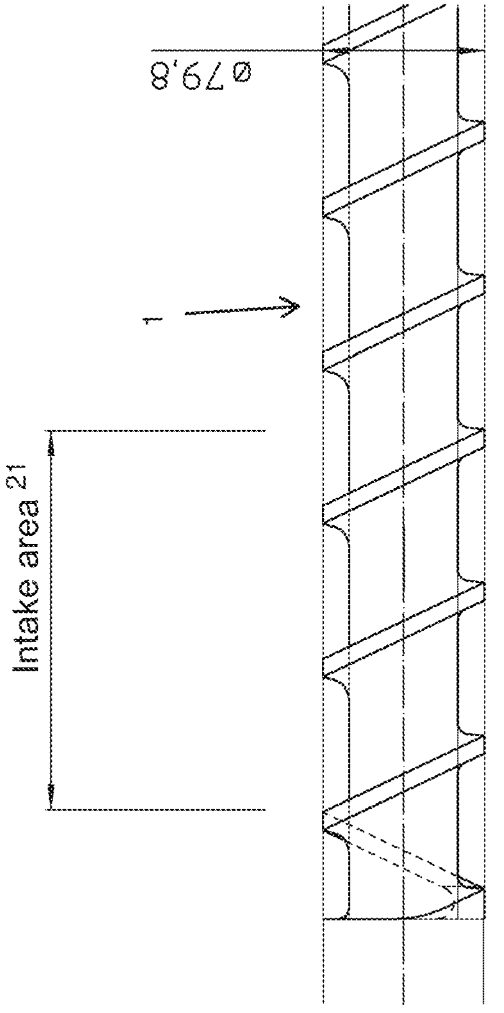
FIGS. 5*a* and 5*b* show a standard screw for comparison.
Figure 5B:
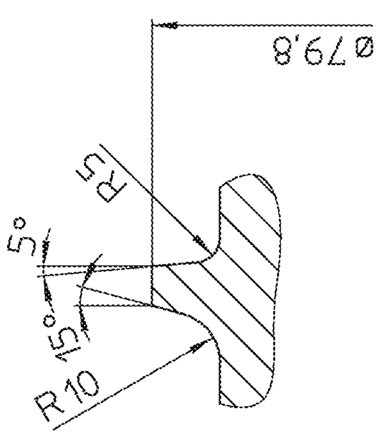

All process parameters as well as the input materials were kept constant, only the screw geometry was varied. A standard extruder screw without undercut and with an angle w2=95° ("standard screw") was chosen as comparison screw. As a screw according to the invention, an extruder screw—similar in the other aspects—with undercut with an undercut angle w2=45° was chosen ("peeling screw"). The specifications and relevant geometries are shown in detail in FIGS. 5*a*, 5*b* for the standard screw and in FIGS. 4*a*, 4*b* for the peeling screw:

| | Standard screw | Peeling screw |
|---|---|---|
| Diameter d [mm] | 79.8 | 79.8 |
| Pitch [mm] | 80 | 80 |
| Web width b [mm] | 8 | 8 |
| Intake or screw depth t1 [mm] | 16 | 16 |

The respective absolute throughput and the throughput consistency, thus the behaviour of the throughput over longer periods, were evaluated. The influence of increasing material density, represented by the temperature in the PCU, was also evaluated. The results are summarized in FIGS. 6 and 7.

Example 1

Test Material 1:

| | |
|---|---|
| Polymer | Expanded polystyrene EPS |
| Material form | Grist |
| Bulk density | 10-15 g/l |
| Moisture | dry |
| Pollution | Clean, production waste |
| Comments | Constant bulk density |

| Standard screw (w2 = 95°) | | | Peeling screw (w2 = 45°) | | |
|---|---|---|---|---|---|
| PCU temperature [° C.] | Throughput [kg/h] | Throughput consistency [%] | PCU temperature [° C.] | Throughput [kg/h] | Throughput consistency [%] |
| 100 | 300 | 14 | 100 | 320 | 9 |
| 105 | 320 | 12 | 105 | 341 | 7 |
| 110 | 333 | 14 | 110 | 354 | 5 |
| 115 | 346 | 11 | 115 | 387 | 2 |
| 120 | 350 | 13 | 120 | 405 | 3 |

In FIG. 6 the results, in particular for throughput and consistency, are shown.

Example 2

Test Material 2:

| | |
|---|---|
| Polymer | Polypropylene PP |
| Material form | Foam polymer |
| Bulk density | 130-140 g/l |
| Pollution | Clean |
| Comments | Comminuted with a mill with a sieve insert with 80 mm holes |

| Standard screw (w2 = 95°) | | | Peeling screw (w2 = 45°) | | |
|---|---|---|---|---|---|
| PCU temperature [° C.] | Throughput [kg/h] | Throughput consistency [%] | PCU temperature [° C.] | Throughput [kg/h] | Throughput consistency [%] |
| 95 | 325 | 6 | 95 | 360 | 3 |
| 100 | 330 | 4 | 100 | 371 | 1 |
| 105 | 351 | 5 | 105 | 385 | 2 |
| 110 | 366 | 4 | 110 | 404 | 3 |
| 115 | 375 | 5 | 115 | 425 | 1 |

In FIG. 7 the results, in particular for throughput and consistency, are shown.

It can be seen that with the undercut screw according to the present invention, higher throughputs were achieved in each case with improved throughput consistency at the same time.

The invention claimed is:

1. A screw for an extruder or conveyor conveying screw or dosing screw for polymers, having a web running helically around a core or screw base, wherein the web at least in a section of the screw is formed with an undercut on its active conveying flank in a conveying direction, wherein the screw, at least in a section of the screw, has an intake depth, measured between an envelope of the screw and the core in a region between two adjacent webs, wherein for the intake depth t1 applies: 0.03*d≤t1≤0.35*d, wherein d is the outer screw diameter in this region, wherein the core, at least in a section of the screw, in a region in which the active conveying flank merges into the core or screw base, has an additional recess in which the core diameter is smaller than in the adjacent regions, wherein for additional depth t2 of the recess applies: **0*t1≤t2≤t1, and in that a core section of the screw is formed adjacent to the recess, straight in a normal cutting plane, which is inclined at an angle in the range of 0°≤w4**≤45° to the envelope of the screw.

2. The screw according to claim 1, wherein the undercut is formed with an undercut angle w2, measured in a vertex on a foremost edge of the web in the conveying direction, in a normal cutting plane normal to the web, between the envelope of the screw and a tangent to the active conveying flank, wherein the undercut angle w2 is in the range of 30°≤w2≤90°.

3. The screw according to claim 2, wherein the undercut angle w2 is in the range of 30°≤w2≤65°.

4. The screw according to claim 1, wherein the active conveying flank, at least in a section of the screw, in a radially outer section is flat or uncurved in the normal cutting plane.

5. The screw according to claim 1, wherein for the intake depth t1 applies: 0.125*d≤t1≤0.35*d, wherein d is the outer screw diameter.

6. The screw according to claim 1, wherein the active conveying flank, at least in a section of the screw, in the region in which the active conveying flank merges into the core, comprises a curvature which extends at least over a range of >1 rad.

7. The screw according to claim 1, wherein an outer web surface of the web, at least in a section of the screw, in a region adjacent to a foremost edge of the web, and completely up to a rearmost edge, is formed uncurved in the normal cutting plane.

8. The screw according to claim 1, wherein an outer web surface, at least in a section of the screw, is oriented parallel to the envelope and/or to a wall of a housing of an extruder.

9. The screw according to claim 1, wherein a passive conveying flank of the web adjoining an outer web surface is flat or uncurved in the normal cutting plane, at least in a section of the screw, in a radially outer section adjacent to the outer web surface up to a maximum of 70% of the passive conveying flank.

10. The screw according to claim 1, wherein a passive conveying flank, at least in a section of the screw, is inclined at a flank angle w3 in the range of 30°≤w3≤90°, measured in a vertex on a rearmost edge of the web in the conveying direction, in a normal cutting plane normal to the web, between the envelope of the screw and a tangent to the passive conveying flank.

11. The screw according to claim 1, wherein the screw is single-start or multi-start having a number of flights in the range of 2 to 20.

12. The screw according to claim 1, wherein for the pitch S of the screw applies: 0.1*d≤S≤5*d, wherein d is the outer screw diameter.

13. The screw according to claim 1, wherein for a web width or the width of an outer web surface applies: 0*S≤b≤0.5*S, wherein S is the pitch of the screw.

14. The screw according to claim 1, wherein the screw, only in a region distal to the conveying direction or in the intake area of an extruder or conveyor, has the undercut and a remaining region of the web has no undercut.

15. An extruder or conveyor having at least one screw according to claim 1, rotatably arranged in a housing.

16. The extruder or conveyor according to claim 15, wherein the screw is formed in a region of an intake opening of the housing or a feeding opening for the material.

17. A device according to claim 15 for the treatment of plastics, the device having a container and/or cutting compressor for pretreating the material to be processed, and the extruder or conveyor tangentially connected thereto.

18. A device for the treatment of plastics having a container for the material to be processed, wherein at least one rotating mixing and/or comminuting tool rotatable about an axis of rotation is arranged in the container for mixing, heating and, if necessary, comminuting the plastic material, wherein a container opening is formed in a side wall of the container in a region of the height of the or the lowermost mixing and/or comminution tool, closest to a bottom of the container, through which the pretreated plastic material can be discharged from the interior of the container, wherein at least an extruder or conveyor according to claim 15 is provided for receiving the material pretreated in the container, wherein the housing of the extruder has an intake opening, located on its end face or in its sheath wall, for the material to be gripped by the screw, and the intake opening is in communication with the container opening.

19. The device according to claim 18, wherein in a region before the container opening or in a region before the intake opening or feeding opening of the conveyor or extruder the direction of rotation of the mixing and/or comminuting tool runs essentially counter to or in the opposite direction to the conveying direction of the extruder.

* * * * *